US012793674B2

(12) United States Patent
Eom et al.

(10) Patent No.: US 12,793,674 B2
(45) Date of Patent: Nov. 10, 2026

(54) ELECTRONIC DEVICE FOR ADAPTIVE SCANNING OF IMAGE

(71) Applicant: Samsung Electronics Co., Ltd., Suwon-si (KR)

(72) Inventors: Gyudong Eom, Suwon-si (KR); Namhyeon Jeon, Suwon-si (KR); Sungwon Ryu, Suwon-si (KR); Sangheon Park, Suwon-si (KR); Dongseop Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/093,616

(22) Filed: Mar. 28, 2025

(65) Prior Publication Data

US 2025/0225957 A1 Jul. 10, 2025

Related U.S. Application Data

(63) Continuation of application No. PCT/KR2023/014942, filed on Sep. 26, 2023.

(30) Foreign Application Priority Data

Sep. 30, 2022 (KR) ........................ 10-2022-0125365
Dec. 5, 2022 (KR) ........................ 10-2022-0167752
(Continued)

(51) Int. Cl.
*G09G 5/39* (2006.01)
*G09G 3/3233* (2016.01)

(52) U.S. Cl.
CPC ............. *G09G 5/39* (2013.01); *G09G 3/3233* (2013.01); *G09G 2320/0257* (2013.01); *G09G 2330/021* (2013.01)

(58) Field of Classification Search
CPC .................. G09G 5/39; G09G 3/3233; G09G 2320/0257; G09G 2330/021; G09G 3/20; G09G 3/3208; G09G 5/36
See application file for complete search history.

(56) References Cited

U.S. PATENT DOCUMENTS 5,948,091 A 9/1999 Kerigan et al.
8,451,279 B2 5/2013 Goria et al.
(Continued)

FOREIGN PATENT DOCUMENTS

CN 113140173 7/2021
JP 7387682 11/2023
(Continued)

OTHER PUBLICATIONS

Extended Search Report dated Aug. 21, 2025 in European Patent Application No. 23873045.1.
(Continued)

*Primary Examiner* — Sahlu Okebato
(74) *Attorney, Agent, or Firm* — Nixon & Vanderhye, P.C.

(57) ABSTRACT

An example electronic device may include at least one processor, a display driving circuit including a graphic random access memory (GRAM), and a display panel. The display driving circuit may be configured to change an image stored in the GRAM from a first image to a second image, the first image being provided within a first time period and the second image being provided within a second time period; display the second image based on a multi-scan of the second image within the second time period based on a time length between a start timing of a last scan of the first image and a start timing of a first scan of the second image being longer than or equal to a reference length; and, on the condition that the time length is shorter than the reference
(Continued)

length, display the second image based on a single scan of the second image within the second time period.

20 Claims, 10 Drawing Sheets

(30) Foreign Application Priority Data

| | | |
|---|---|---|
| Dec. 23, 2022 | (KR) | 10-2022-0183688 |
| Jan. 4, 2023 | (KR) | 10-2023-0001471 |
| Sep. 25, 2023 | (WO) | PCT/KR2023/014711 |

(56) References Cited

U.S. PATENT DOCUMENTS

| | | | | |
|---|---|---|---|---|
| 8,878,995 | B2 | 11/2014 | Cha et al. | |
| 9,704,215 | B2 | 7/2017 | Kim et al. | |
| 9,830,880 | B1 | 11/2017 | Wyatt | |
| 10,049,629 | B2 | 8/2018 | Oh et al. | |
| 10,062,314 | B2 | 8/2018 | Lee et al. | |
| 10,430,918 | B2 | 10/2019 | Kim et al. | |
| 10,810,927 | B2 | 10/2020 | Lee et al. | |
| 11,087,721 | B2 | 8/2021 | Kim et al. | |
| 11,270,615 | B2 | 3/2022 | Choi et al. | |
| 11,336,879 | B2 | 5/2022 | Kwon | |
| 11,412,173 | B2 | 8/2022 | Yamamoto et al. | |
| 11,450,265 | B2 | 9/2022 | Yoo et al. | |
| 11,501,734 | B2 | 11/2022 | Han et al. | |
| RE49,524 | E | 5/2023 | Park | |
| 11,670,212 | B2 | 6/2023 | Lee et al. | |
| 11,721,272 | B2 | 8/2023 | Lee et al. | |
| 11,935,489 | B2 | 3/2024 | Wai et al. | |
| 12,018,403 | B2 | 6/2024 | Vasquez et al. | |
| 12,062,316 | B2 | 8/2024 | Kim | |
| 12,165,590 | B2 | 12/2024 | Sang et al. | |
| 2002/0093473 | A1* | 7/2002 | Tanaka | G09G 3/3648 345/87 |
| 2004/0090435 | A1* | 5/2004 | Kim | G09G 3/20 345/204 |
| 2010/0053182 | A1 | 3/2010 | Jeon et al. | |
| 2013/0235055 | A1 | 9/2013 | Kim et al. | |
| 2014/0198021 | A1 | 7/2014 | Tu et al. | |
| 2015/0029201 | A1 | 1/2015 | Cha et al. | |
| 2016/0078846 | A1 | 3/2016 | Liu et al. | |
| 2016/0217763 | A1 | 7/2016 | Toyoda et al. | |
| 2017/0193971 | A1 | 7/2017 | Bi et al. | |
| 2019/0096358 | A1 | 3/2019 | Zhao et al. | |
| 2020/0066226 | A1 | 2/2020 | Han et al. | |
| 2020/0143744 | A1 | 5/2020 | Kim et al. | |
| 2020/0326752 | A1* | 10/2020 | Jung | G09G 3/20 |
| 2021/0312871 | A1 | 10/2021 | Park et al. | |
| 2022/0189408 | A1 | 6/2022 | Jo et al. | |
| 2023/0123776 | A1 | 4/2023 | Lee et al. | |
| 2023/0161455 | A1 | 5/2023 | Kim et al. | |

FOREIGN PATENT DOCUMENTS

| | | | |
|---|---|---|---|
| KR | 10-2010-0025095 | 3/2010 | |
| KR | 10-2013-0027094 | 3/2013 | |
| KR | 10-2022-0048409 | 4/2014 | |
| KR | 10-1158876 | 6/2016 | |
| KR | 10-2325816 | 11/2016 | |
| KR | 10-2017-0064292 | 6/2017 | |
| KR | 10-2018-0076490 | 7/2018 | |
| KR | 10-1885331 | 7/2018 | |
| KR | 10-2018-0118209 | 10/2018 | |
| KR | 10-2020-0052036 | 5/2020 | |
| KR | 10-2211123 | 1/2021 | |
| KR | 10-2021-0017468 | 2/2021 | |
| KR | 10-2305765 | 9/2021 | |
| KR | 10-2021-0158110 | 12/2021 | |
| KR | 10-2022-0006729 | 1/2022 | |
| KR | 10-2022-0046464 | 4/2022 | |
| KR | 10-2022-0060113 | 5/2022 | |
| KR | 10-2022-0079381 | 6/2022 | |
| KR | 10-2022-0081161 | 6/2022 | |
| KR | 10-2022-0088213 | 6/2022 | |
| KR | 10-2022-0100777 | 7/2022 | |
| KR | 10-2022-0111163 | 8/2022 | |
| KR | 10-2022-0115030 | 8/2022 | |
| KR | 10-2429559 | 8/2022 | |
| KR | 10-2452154 | 10/2022 | |
| KR | 10-2648601 | 3/2024 | |
| WO | WO-2023150224 A1 * | 8/2023 | G09G 3/20 |

OTHER PUBLICATIONS

International Search Report and Written Opinion dated Jan. 11, 2024 in International Patent Application No. PCT/KR2023/014711 and English translation.

International Search Report and Written Opinion dated Jan. 23, 2024 in International Patent Application No. PCT/KR/2023014942 and English translation.

Notice of Allowance dated Aug. 29, 2024 in the U.S. Appl. No. 18/487,669.

* cited by examiner

ELECTRONIC DEVICE FOR ADAPTIVE SCANNING OF IMAGE

CROSS-REFERENCE TO RELATED APPLICATIONS

This application is a continuation of International Application No. PCT/KR2023/014942, designating the United States, filed on Sep. 26, 2023, in the Korean Intellectual Property Receiving Office, and claiming priority to Korean Patent Application Nos. 10-2022-0125365 filed on Sep. 30, 2022; 10-2022-0167752 filed on Dec. 5, 2022; 10-2022-0183688 filed on Dec. 23, 2022; and 10-2023-0001471 filed on Jan. 4, 2023, in the Korean Intellectual Property Office, and PCT/KR2023/014711 filed on Sep. 25, 2023, the disclosures of each of which are incorporated by reference herein in their entireties.

BACKGROUND

Field

The disclosure relates to an electronic device for adaptive scanning of an image.

Description of Related Art

An electronic device may include a processor, display driver circuitry, and a display panel. For example, the display driver circuitry may display, on the display panel, an image obtained by the processor. For example, the display driver circuitry may provide a synchronization signal to the processor. The processor may identify a timing providing an image to the display driver circuitry based on the synchronization signal, and may provide, to the display driver circuitry, the image in accordance with the timing. The display driver circuitry may store or write the image in memory in the display driver circuitry. The display driver circuitry may display, on the display panel, the image by scanning (or reading) the image stored in the memory.

The above-described information may be provided as related art for the purpose of helping to understand the present disclosure. No claim or determination is raised as to whether any of the above-described information may be applied as a prior art related to the present disclosure.

SUMMARY

In an example embodiment, an electronic device may include a processor (including, e.g., processing circuitry); display driver circuitry including a graphic random access memory (GRAM); and a display panel. The display driver circuitry may be configured to change an image stored in the GRAM, from a first image provided from the processor in a first time interval in response to a synchronization signal from the display driver circuitry, to a second image provided from the processor in a second time interval subsequent to the first time interval in response to the synchronization signal; on a condition that a time length between a start timing of a last scanning, of the first image stored in the GRAM, which was executed in the first time interval and a start timing of an initial scanning of the second image stored in the GRAM is longer than or equal to a reference length, based on executing multiple scans of the second image stored in the GRAM in the second time interval, display, on the display panel, the second image; and on a condition that the time length is shorter than the reference length, based on executing a single scan of the second image stored in the GRAM in the second time interval, display, on the display panel, the second image.

In an example embodiment, an electronic device may include a processor (including, e.g., processing circuitry); display driver circuitry including a graphic random access memory (GRAM); and a display panel. The display driver circuitry may be configured to change an image stored in the GRAM, from a first image provided from the processor in a first time interval in response to a synchronization signal from the display driver circuitry, to a second image provided from the processor in a second time interval subsequent to the first time interval in response to the synchronization signal; on a condition that a single scan of the first image stored in the GRAM is executed within the first time interval for displaying of the first image, display, on the display panel, the second image based on executing multiple scans of the second image stored in the GRAM within the second time interval; and on a condition that multiple scans of the first image stored in the GRAM are executed within the first time interval for displaying of the first image, display, on the display panel, the second image, based on executing a single scan of the second image stored in the GRAM within the second time interval.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

An electronic device may display an image based on a refresh rate. For example, the refresh rate may be adaptively changed. For example, the electronic device may lower the refresh rate to reduce power consumed by displaying an image on a display panel. For example, the electronic device may change the refresh rate from a first refresh rate to a second refresh rate lower than the first refresh rate. For example, providing the second refresh rate reduces power consumed by displaying an image on the display panel, but an afterimage, image sticking, or image persistence may be caused while providing the second refresh rate. For example, a probability that the afterimage is caused while providing the second refresh rate may be higher than a probability that the afterimage is caused while providing the first refresh rate. For example, the display panel may include sub-pixels. For example, each of the sub-pixels may include a light emitting diode (LED) (e.g., an organic light emitting diode (OLED)) and a transistor (e.g., a driver transistor) for providing a current to the LED. For example, the afterimage may be caused by hysteresis in the transistor. The hysteresis and the afterimage are discussed with reference to FIG. 1.

Figure 1:
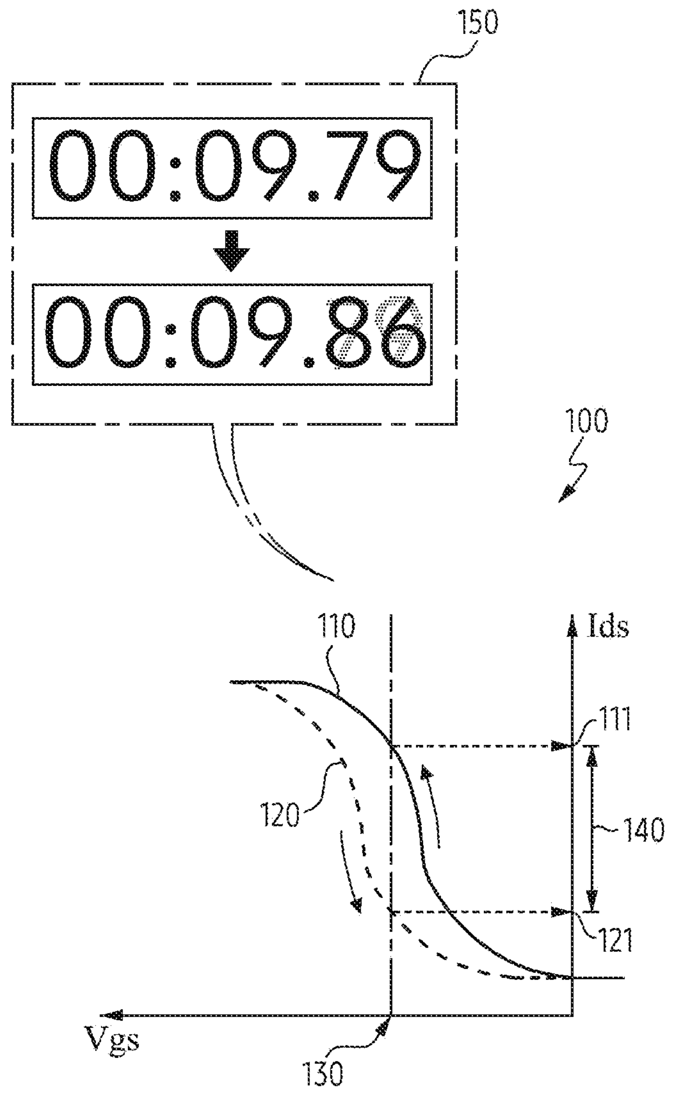
FIG. 1 illustrates an example of an afterimage in accordance with hysteresis in a transistor.

FIG. 1 illustrates an example of an afterimage in accordance with hysteresis in a transistor.

Referring to FIG. 1, a threshold voltage of the transistor may be shifted when changing from an image of a first color (e.g., black) to an image of a second color (e.g., white). For example, the shifting of the threshold voltage may cause a change in luminance provided from the LED driven through the transistor.

For example, a chart 100 indicates the change. A horizontal axis of the chart 100 indicates a gate electrode-source voltage (Vgs) of the transistor, and a vertical axis of the chart 100 indicates a current (Ids) applied to the OLED. For example, a line 110 in the chart 100 indicates a relation between a gate electrode-source voltage (Vgs) and a current (Ids) for the image of the first color, and a line 120 in the chart 100 indicates a relation between a gate electrode-source voltage (Vgs) and a current (Ids) for the image of the second color. As shown in the chart 100, the line 120 may be offset relative to the line 110. For example, a value 111 of the current (Ids) in the line 110 when the gate electrode-source voltage (Vgs) is a value 130 may be different from a value 121 of the current (Ids) in the line 120 when the gate electrode-source voltage Vgs is the value 130. For example, a difference 140 between the value 111 and the value 121 may cause an afterimage. For example, the afterimage, indicated as a state 150 in which the first color is changed to the second color, may be caused by the difference 140.

An electronic device discussed below may execute operations to reduce occurrence of afterimage. For example, the electronic device may adaptively execute multiple scans or a single scan in a time interval (e.g., a cycle of a vertical synchronization signal) to reduce occurrence of afterimage.

Figure 2:
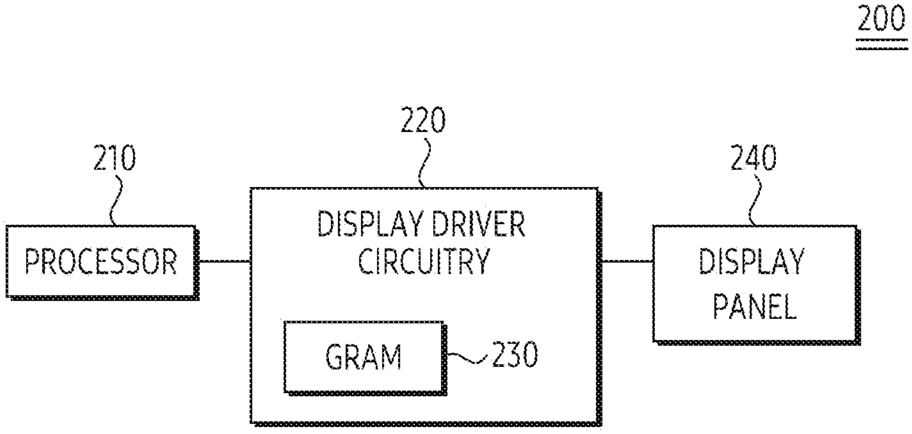
FIG. 2 is a simplified block diagram of an example electronic device according to various embodiments.

FIG. 2 is a simplified block diagram of an example electronic device according to various embodiments.

Referring to FIG. 2, an electronic device 200 may include a processor 210, display driver circuitry 220, and a display panel 240.

For example, the (at least one) processor 210 (including, e.g., processing circuitry) may be used to obtain an image to be displayed on the display panel 240. For example, the processor 210 may provide the image to the display driver circuitry 220, in response to a synchronization signal (e.g., a tearing effect (TE) signal) from the display driver circuitry 220. For example, the processor 210 may include at least a portion of a processor 920 of FIG. 9.

For example, the display driver circuitry 220 may be used to display the image obtained from the processor 210 on the display panel 240. For example, the display driver circuitry 220 may include a graphic random access memory (GRAM) 230. For example, the display driver circuitry 220 may store, in the GRAM 230, the image provided from the processor 210, in response to the synchronization signal provided from the display driver circuitry 220 to the processor 210. For example, the display driver circuitry 220 may display, on the display panel 240, the image, based at least in part on scanning the image stored in the GRAM 230. For example, the display driver circuitry 220 may display, on the display panel 240, the image, based on bypassing scanning again the image after the image is scanned. For example, the display driver circuitry 220 may include at least a portion of a display driver integrated circuit (DDI) 1030 of FIG. 10. For example, the GRAM 230 may include at least a portion of memory 1033 of FIG. 10.

For example, the display panel 240 may include sub-pixels. For example, each of the sub-pixels may include a light emitting diode LED (e.g., OLED) and a first transistor (e.g., a driver transistor) to provide a current to the LED (or transistor to drive the LED). For example, each of the sub-pixels may include a second transistor that includes a drain connected to a source of the first transistor and a source connected to a driving voltage line transmitting a driving voltage (ELVDD). For example, each of the sub-pixels may include a second transistor that includes a source connected to a drain of the first transistor and a drain connected to an anode of the LED. For example, the display driver circuitry 220 may provide, to a gate electrode of each of the first transistor and the second transistor, a light emitting signal for transmitting the current to the LED. When the light emitting signal is provided to the first transistor and the second transistor, the current may be provided to the LED. The LED may emit light based on the current. For example, the display panel 240 may include at least a portion of a display 1010.

For example, the display driver circuitry 220 may store (or write), in the GRAM 230, a first image provided from the processor 210 within a first time interval in response to the synchronization signal. For example, the first time interval may correspond to a cycle of a vertical synchronization signal. For example, the first time interval may correspond to a frames per second (FPS) of a content provided through displaying of the first image and a second image to be illustrated below. For example, the display driver circuitry 220 may display, on the display panel 240, the first image, by scanning the first image stored in the GRAM 230 within the first time interval. For example, the scan of the first image may be a single scan to be described below or multiple scans to be described below.

For example, the display driver circuitry 220 may change an image stored (or written) in the GRAM 230 from the first image to a second image provided from the processor 210 within a second time interval subsequent to the first time interval, in response to the synchronization signal. For example, the second time interval may correspond to a cycle of a vertical synchronization signal. For example, the second time interval may correspond to the FPS of the content. For example, a length of the second time interval may be equal to a length of the first time interval. However, it is not limited thereto. For example, the length of the second time interval may be different from the length of the first time interval.

For example, on a condition that a time length between a start timing of a last scanning, of the first image stored in the GRAM 230, which was executed within the first time interval and a start timing of an initial scanning of the second image stored in the GRAM 230 is longer than or equal to a reference length, the display driver circuitry 220 may display, on the display panel 240, the second image, based on executing multiple scans of the second image stored in the GRAM 230 within the second time interval. Executing the multiple scans will be described with reference to FIGS. 3 and 4.

Figure 3:
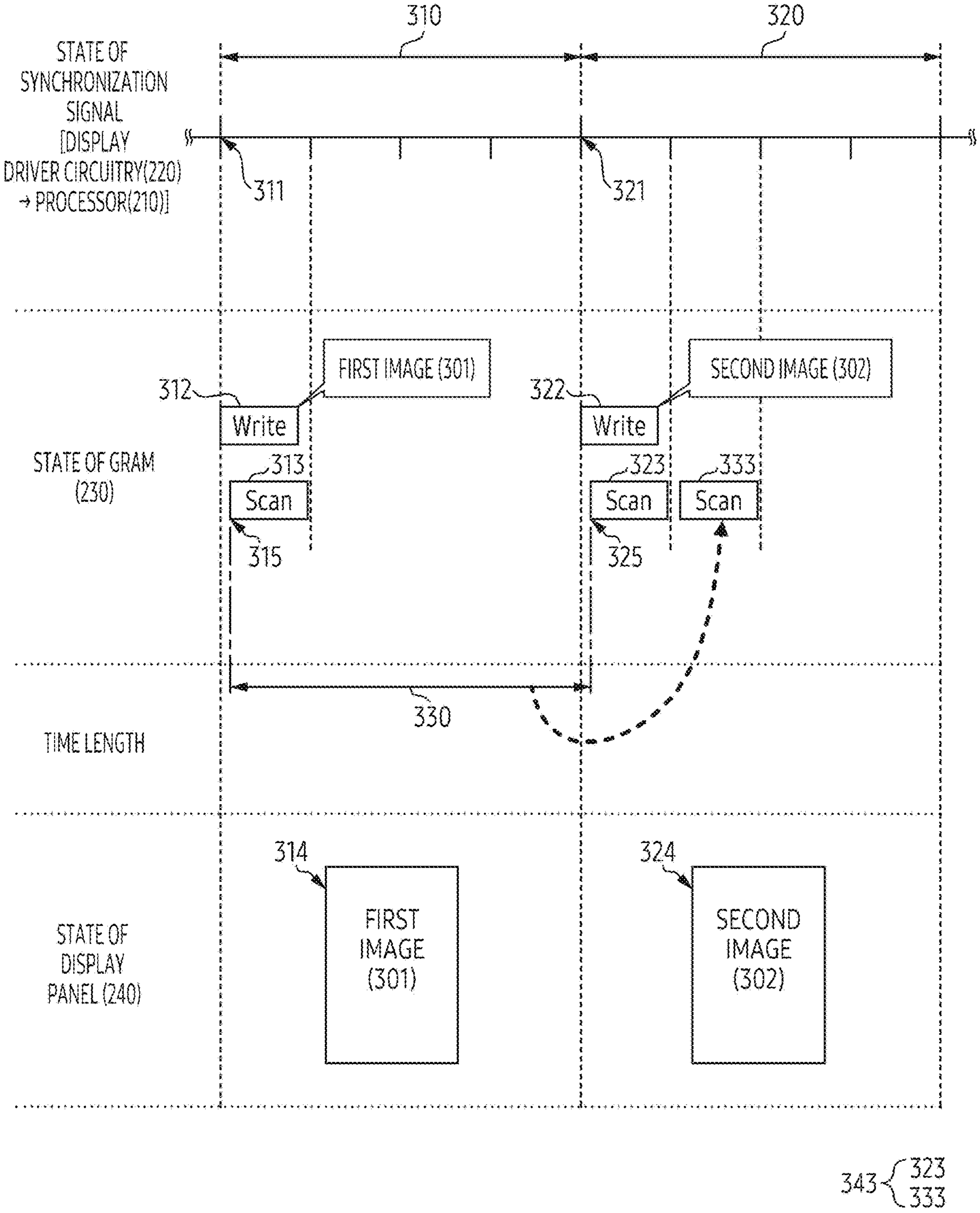
FIGS. 3 and 4 illustrate an example method of executing multiple scans within a time interval according to various embodiments.
Figure 4:
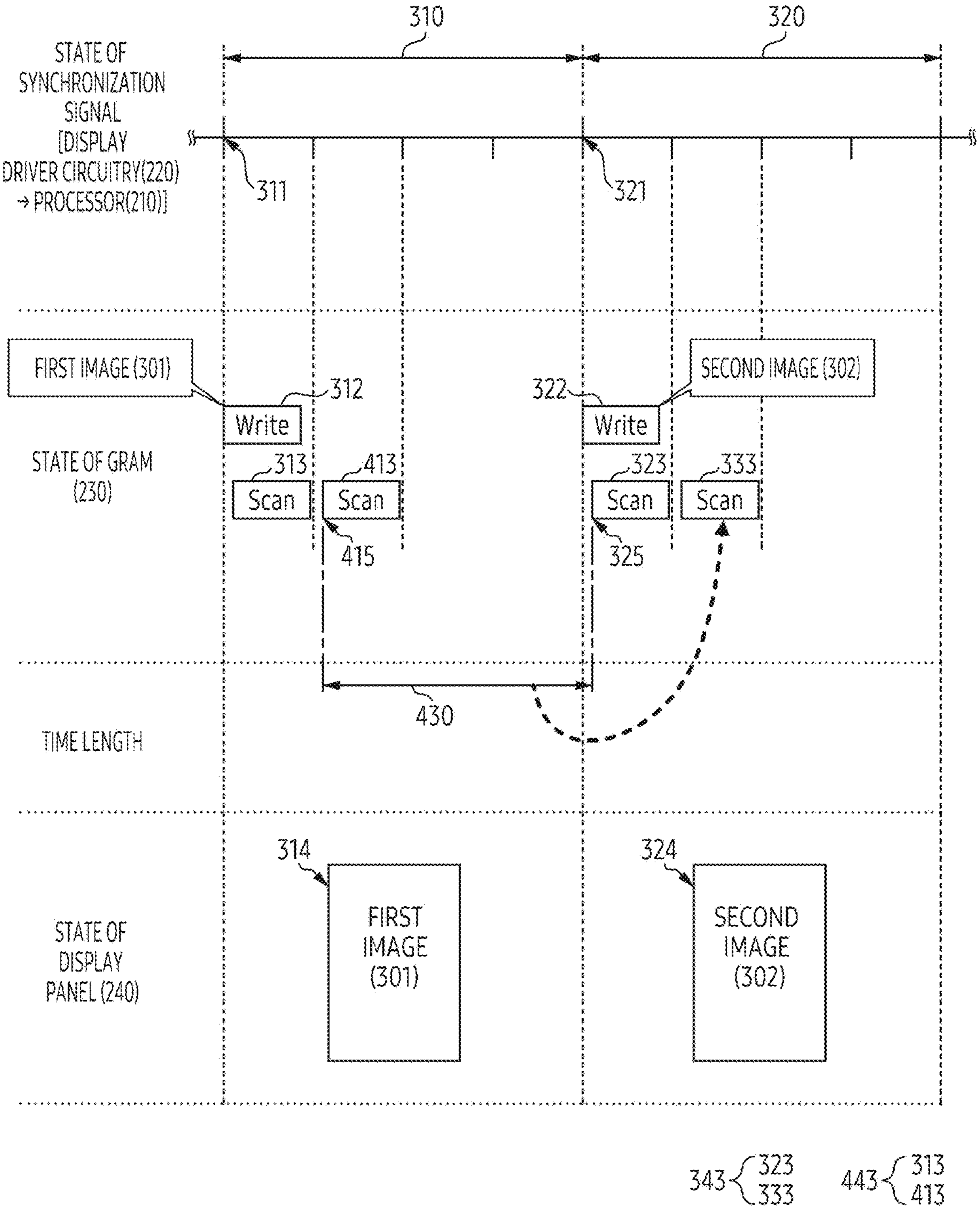

FIGS. 3 and 4 illustrate an example method of executing multiple scans within a time interval according to various embodiments.

Referring to FIG. 3, the processor 210 may provide, to the display driver circuitry 220, a first image 301 within a first time interval 310, in response to the synchronization signal at a timing 311. For example, the display driver circuitry 220 may execute writing 312 of the first image 301 obtained from the processor 210 in the GRAM 230 within the first time interval 310. For example, the display driver circuitry 220 may execute a scan 313 of the first image 301 written in the GRAM 230 within the first time interval 310. For example, the display driver circuitry 220 may display on the display panel 240, the first image 301, as in a state 314, based on the scan 313 of the first image 301.

In response to the synchronization signal at a timing 321, the processor 210 may provide, to the display driver circuitry 220, a second image 302 subsequent to the first image 301 within the second time interval 320 subsequent to the first time interval 310. For example, the display driver circuitry 220 may execute writing 322 of the second image 302 obtained from the processor 210 in the GRAM 230 within the second time interval 320. For example, the display driver circuitry 220 may execute a scan 323 of the second image 302, written in the GRAM 230.

For example, on a condition that a time length 330 between a start timing 315 of the scan 313 and a start timing 325 of the scan 323 is longer than or equal to the reference length, the display driver circuitry 220 may execute a scan 333, of the second image 302, which is an additional (or extra) scan of the second image 302, within the second time interval 320. For example, the scan 333 of the second image 302 may be executed within the second time interval 320 to reduce occurrence of afterimage. For example, since the time length 330 being longer than or equal to the reference length indicates that a probability of afterimage occurring is relatively high, the display driver circuitry 220 may execute the scan 333 of the second image 302. For example, the display driver circuitry 220 may execute multiple scans 343 of the second image 302, including the scan 323 of the second image 302 and the scan 333 of the second image 302, within the second time interval 320. For example, the display driver circuitry 220 may display, on the display panel 240, the second image 302, based on the multiple scans 343, as in a state 324.

For example, the multiple scans 343 may include applying a data voltage to a gate electrode of the transistor in accordance with the scan 323 and applying repeatedly the data voltage to the gate electrode in accordance with the scan 333. For example, applying the data voltage to the gate electrode may indicate storing the data voltage in a capacitor (e.g., storage capacitor) electrically connected to the gate electrode. For example, the multiple scans 343 may include initializing the gate electrode before the data voltage is applied in accordance with the scan 323, and initializing repeatedly the gate electrode before the data voltage is applied repeatedly in accordance with the scan 333. For example, each of the scan 323 and the scan 333 may be an address scan. For example, the address scan may include initializing the gate electrode of the transistor, applying the data voltage to the initialized gate electrode, and providing the current to each of the LEDs through the transistor to which the data voltage is applied to the gate electrode.

For example, unlike the second time interval 320 that includes the multiple scans 343 including the scan 323 and the scan 333, since the first time interval 310 includes only the scan 313, the scan 313 may be referred to as a single scan. For example, the single scan may include applying a data voltage to the gate electrode in accordance with the scan 313. For example, the single scan may include initializing the gate electrode before the data voltage is applied in accordance with the scan 313. For example, like each of the scan 323 and the scan 333, the scan 313 may be an address scan.

Although not illustrated in FIG. 3, each of the first time interval 310 and the second time interval 320 may further include a self-scan. For example, the display driver circuitry 220 may execute the self-scan within each of the first time interval 310 and the second time interval 320. For example, the self-scan within the first time interval 310 may be executed after the scan 313 is executed. For example, the self-scan within the second time interval 320 may be executed after the scan 333 is executed. For example, unlike an address scan, a self-scan may include providing the current to the LED through the transistor from among initializing the gate electrode, applying a data voltage to the initialized gate electrode, and providing a current to the LED through the transistor. For example, a self-scan may indicate bypassing of initializing of the gate electrode and of applying of the data voltage to the initialized gate electrode, and may indicate providing the current to the LED through the transistor before the gate electrode to which the data voltage is applied is initialized. For example, a self-scan may indicate bypassing of scanning an image stored in the GRAM 230 like each of the scan 313, the scan 323, and the scan 333, and may indicate executing a scan through a light emitting signal in a state in which at least a portion of the data voltage applied to the gate electrode is maintained in accordance with each of the scan 313 and the scan 333. However, the disclosure is not limited in this respect.

As described above, the display driver circuitry 220 may execute multiple scans 343 within the second time interval 320, in accordance with a comparison result between the time length 330 and the reference length. For example, a start timing of the time length 330 may be changed when multiple scans of the first image 301 are executed within the first time interval 310. A change in the start timing of the time length 330 will be discussed with reference to FIG. 4.

Referring to FIG. 4, the processor 210 may provide, to the display driver circuitry 220, the first image 301 within the first time interval 310, in response to the synchronization signal at a timing 311. For example, the display driver circuitry 220 may execute writing 312 of the first image 301 obtained from the processor 210 in the GRAM 230 within the first time interval 310. For example, the display driver circuitry 220 may execute a scan 313 of the first image 301 written in the GRAM 230, within the first time interval 310. For example, the display driver circuitry 220 may further execute a scan 413 of the first image 301 within the first time interval 310 to reduce occurrence of afterimage. For example, the display driver circuitry 220 may execute multiple scans 443 including the scan 313 and the scan 413 within the first time interval 310. For example, the display driver circuitry 220 may display, on the display panel 240, the first image 301, based on the multiple scans 443, as in a state 314.

In response to the synchronization signal at a timing 321, the processor 210 may provide, to the display driver circuitry 220, the second image 302 subsequent to the first image 301 within the second time interval 320 subsequent to the first time interval 310. For example, the display driver circuitry 220 may execute writing 322 of the second image 302 obtained from the processor 210 in the GRAM 230 within the second time interval 320. For example, the display driver circuitry 220 may execute a scan 323 of the second image 302 written in the GRAM 230.

For example, on a condition that a time length 430 between a start timing 415 of the scan 413, which is a last scanning of the first image 301 executed within the first time interval 310, and a start timing 325 of the scan 323 is longer than or equal to the reference length, the display driver circuitry 220 may execute the scan 333 of the second image 302 within the second time interval 320. For example, the scan 333 of the second image 302 may be executed within the second time interval 320 to reduce occurrence of afterimage. For example, since the time length 430 being longer than or equal to the reference length indicates that a probability of afterimage occurring is relatively high, the display driver circuitry 220 may execute the scan 333 of the second image 302. For example, the display driver circuitry 220 may execute, within the second time interval 320, multiple scans 343 of the second image 302 including the scan 323 of the second image 302 and the scan 333 of the second image 302. For example, the display driver circuitry 220 may display, on the display panel 240, the second image 302, based on the multiple scans 343, as in the state 324.

Although not illustrated in FIG. 4, each of the first time interval 310 and the second time interval 320 may further include a self-scan. For example, the display driver circuitry 220 may execute a self-scan within each of the first time interval 310 and the second time interval 320. For example, the self-scan within the first time interval 310 may be executed after the scan 413 is executed. For example, a self-scan within the second time interval 320 may be executed after the scan 333 is executed. However, the disclosure is not limited in this respect.

Unlike the illustrations in FIGS. 3 and 4, on a condition that the time length 330 or the time length 430 is shorter than the reference length, the display driver circuitry 220 may display, on the display panel 240, the second image 302, based on executing a single scan of the second image 302 within the second time interval 320. The single scan of the second image 302 will be discussed with reference to FIG. 5.

Figure 5:
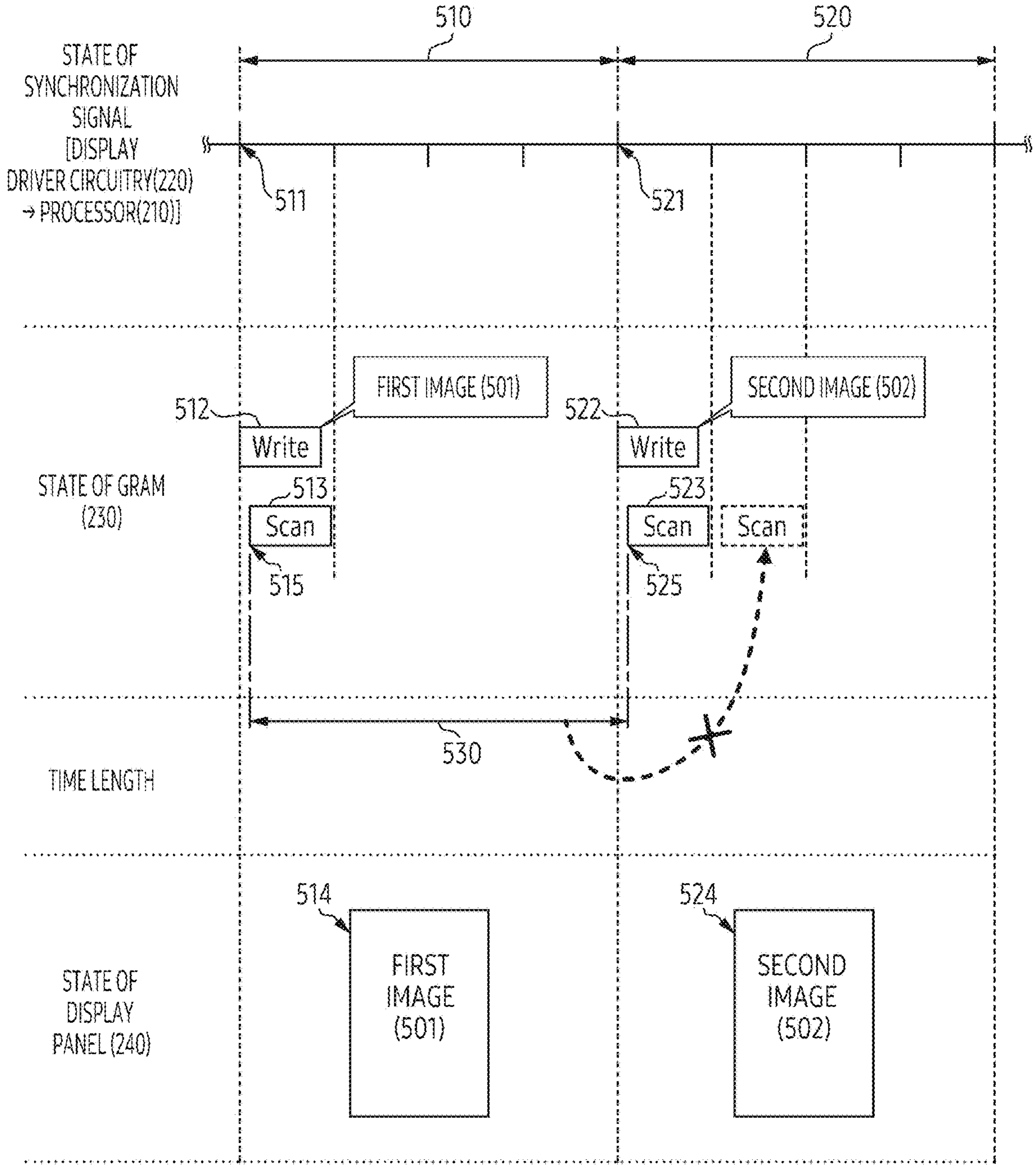
FIG. 5 illustrates an example method of executing a single scan within a time interval according to various embodiments.

FIG. 5 illustrates an example method of executing a single scan within a time interval according to various embodiments.

Referring to FIG. 5, the processor 210 may provide a first image 501 to the display driver circuitry 220 within a first time interval 510, in response to the synchronization signal at a timing 511. For example, the display driver circuitry 220 may execute writing 512 of the first image 501 obtained from the processor 210 in the GRAM 230 within the first time interval 510. For example, the display driver circuitry 220 may execute a scan 513 of the first image 501 written in the GRAM 230 within the first time interval 510. For example, the display driver circuitry 220 may display the first image 501 on the display panel 240, based on the scan 513 of the first image 501, as in a state 514.

The processor 210 may provide, to the display driver circuitry 220, a second image 502 subsequent to the first image 501 within a second time interval 520 subsequent to the first time interval 510, in response to the synchronization signal at a timing 521. For example, the display driver circuitry 220 may execute writing 522 of the second image 502 obtained from the processor 210 in the GRAM 230 within the second time interval 520. For example, the display driver circuitry 220 may execute a scan 523 of the second image 502 written in the GRAM 230.

For example, unlike the examples of FIGS. 3 and 4, on a condition that a time length 530 between a start timing 515 of the scan 513 and a start timing 525 of the scan 523 is shorter than the reference length, the display driver circuitry 220 may bypass or refrain from executing multiple scans within the second time interval 520 and execute a single scan (e.g., the scan 523) within the second time interval 520. For example, since the reference length 530 being shorter than the reference length indicates that a probability of afterimage occurring is relatively low, the display driver circuitry 220 may execute the single scan within the second time interval 520 to reduce power consumption in accordance with displaying of an image. For example, the display driver circuitry 220 may display, on the display panel 240, the second image 502, based on the single scan, as in a state 524.

Although not illustrated in FIG. 5, each of the first time interval 510 and the second time interval 520 may further include a self-scan. For example, the display driver circuitry 220 may execute a self-scan within each of the first time interval 510 and the second time interval 520. For example, a self-scan within the first time interval 510 may be executed after the scan 513 is executed. For example, a self-scan within the second time interval 520 may be executed after the scan 523 is executed.

Although FIG. 5 illustrates an example in which a single scan of the first image 501 is executed within the first time interval 510, the method discussed with reference to FIG. 5 may also be applied when multiple scans of the first image 501 are executed within the first time interval 510. For example, on a condition that a time length between a start timing of a last scanning of the multiple scans of the first image 501 and the start timing 525 of the scan 523 is shorter than the reference length, when the multiple scans of the first image 501 are executed within the first time interval 510, the display driver circuitry 220 may display, on the display panel 240, the second image 502, based on executing the scan 523, as in the state 524.

Referring back to FIG. 2, providing multiple scans within a time interval may be enabled or disabled in the electronic device 200 based on another parameter.

For example, providing multiple scans may be enabled based on identifying that a content provided through displaying the first image and the second image includes a high contrast area (e.g., an area with only (or mainly) having black color and white color). For example, the display driver circuitry 220 may enable providing the multiple scans based on the content including a high contrast area, and execute the multiple scans or the single scans within a time interval based on a relation between a time length and the reference length as described above. For example, the display driver circuitry 220 may disable providing the multiple scans based on the content that does not include a high contrast area or includes a high contrast area having a size smaller than a reference size, and may execute the single scans within a time interval independently of a relation between a time length and the reference length described above.

For example, providing multiple scans may be enabled based on identifying that a content provided through displaying the first image and the second image includes a visual object having a shape, changed in accordance with a change of an image. For example, a position of the visual object may be maintained independently of the change of the image. As a non-limiting example, the visual object may provide a function of a stopwatch, a function for volume control, or a function for displaying time in a lock screen. For example, the display driver circuitry 220 may enable providing multiple scans based on the content including the visual object, and execute the multiple scans or the single scans within a time interval based on a relation between a time length and the reference length described above. For example, the display driver circuitry 220 may disable providing multiple scans based on the content not including the visual object, and execute the single scans within a time interval independently of a relation between a time length and the reference length described above.

For example, providing multiple scans may be enabled based on identifying that a frames per second (FPS) of a content provided through displaying the first image and the second image is less than or equal to a reference value. For example, the display driver circuitry 220 may enable providing multiple scans based on the FPS being less than or equal to the reference value, and execute multiple scans or single scans within a time interval based on a relation between a time length and the reference length described above. For example, the display driver circuitry 220 may disable providing multiple scans based on the FPS being greater than the reference value, and execute single scans within a time interval independently of a relation between a time length and the reference length described above.

For example, providing multiple scans may be enabled based on a remaining level of a rechargeable battery of the electronic device 200. For example, the display driver circuitry 220 may enable providing multiple scans based on the remaining level being greater than or equal to a reference level, and execute multiple scans or single scans within a time interval based on a relation between a time length and the reference length described above. For example, the display driver circuitry 220 may disable providing multiple scans based on the remaining level being less than the reference level, and execute the scans within a time interval, independently of a relation between a time length and the reference length described above.

The reference length described above may be changed in accordance with a state of the electronic device 200, a state of an environment in which the electronic device 200 is positioned, and/or a setting of the electronic device 200.

For example, the reference length may be identified based on the remaining level of the battery of the electronic device 200. For example, the reference length may be identified as a first value based on the remaining level being a first level, and may be identified as a second value higher than the first value based on the remaining level being a second level lower than the first level. However, the disclosure is not limited in this respect.

For example, the reference length may be identified based on an illuminance around the electronic device 200. For example, the illuminance may be indicated by data obtained through an illuminance sensor (e.g., sensor module 976 of FIG. 9) of the electronic device 200. For example, the reference length may be identified as a first value based on the data indicating a first illuminance, and may be identified as a second value higher than the first value based on the data indicating a second illuminance higher than the first illuminance. However, the disclosure is not limited in this respect.

For example, the reference length may be identified based on a setting of the electronic device 200. For example, the setting may be adaptively changed without a user input, based on the remaining level of the battery of the electronic device 200. For example, the setting may be identified based on a user input. For example, when the setting is in a state that emphasizes a quality of an image displayed on the display panel 240 relative to reduction of power consumption in the electronic device 200, the reference length may be identified as a first value. For example, when the setting is in a state that emphasizes the reduction of the power relative to the quality of the image, the reference length may be identified as a second value higher than the first value. However, the disclosure is not limited in this respect.

For example, the electronic device 200 may provide various services based on changing a relation between a time corresponding to an FPS of a content provided through displaying the first image and the second image and the reference length.

For example, the processor 210 may identify the reference length as being longer than the time. For example, since the reference length longer than the time indicates the disabling of providing multiple scans, the electronic device 200 may reduce power consumed by providing the content through the reference length longer than the time.

For example, the processor 210 may identify the reference length as being shorter than the time. For example, since the reference length shorter than the time indicates the enabling of providing multiple scans, the electronic device 200 may reduce occurrence of afterimage while the content is provided through the reference length shorter than the time.

For example, the processor 210 may identify the reference length as being equal to the time. For example, the reference length equal to the time may indicate alternately executing multiple scans and single scan. Alternately executing the multiple scans and the single scan will be described with reference to FIG. 6.

Figure 6:
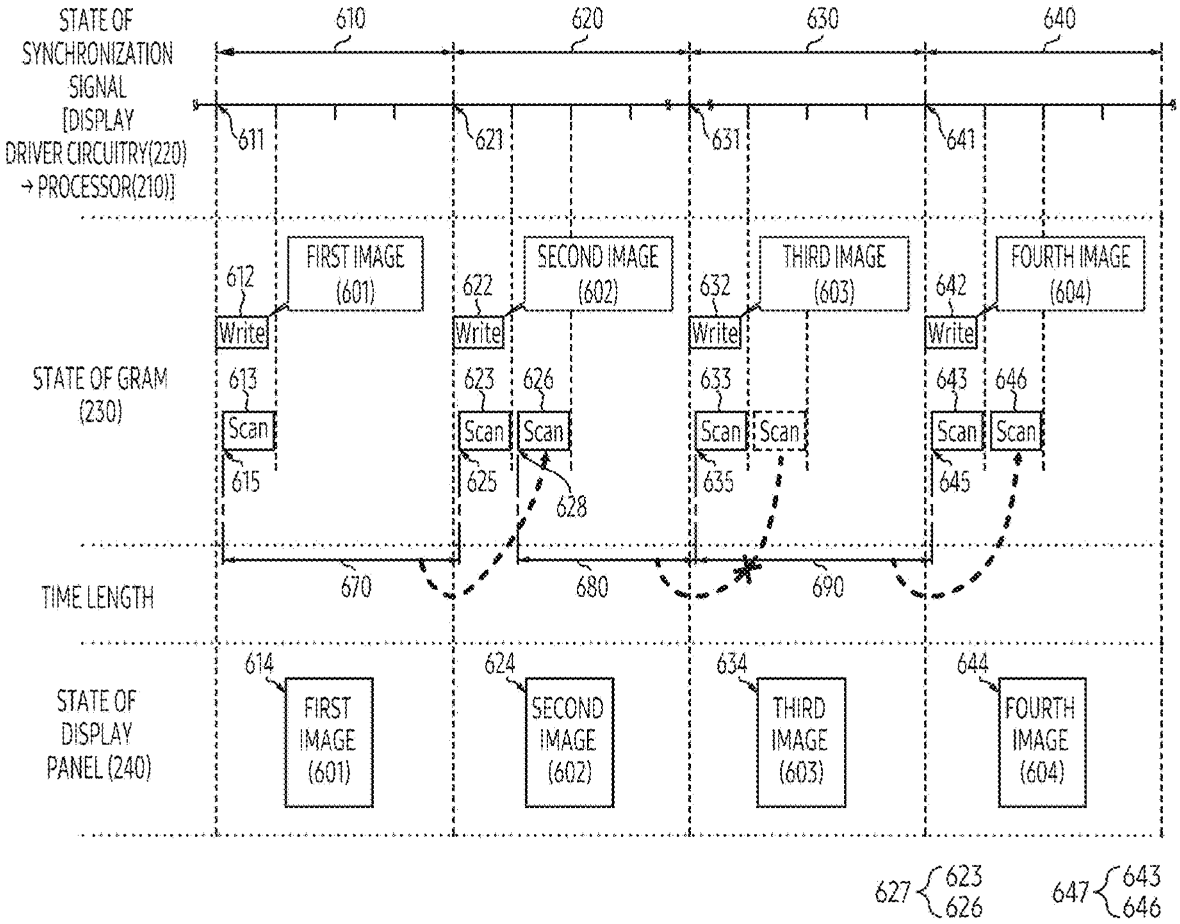
FIG. 6 illustrates an example method of alternately executing multiple scans and a single scan according to various embodiments.

FIG. 6 illustrates an example method of alternately executing multiple scans and a single scan in accordance with various embodiments.

Referring to FIG. 6, the reference length may be equal to a length of each of a first time interval 610, a second time interval 620, a third time interval 630, and a fourth time interval 640. For example, the reference length may correspond to an FPS of a content provided through displaying of a first image 601, a second image 602, a third image 603, and a fourth image 604. For example, as discussed below, the display driver circuitry 220 may identify a time length between a start timing of a scan within a previous time interval and a start timing of a scan within a current time interval (or timing of a vertical synchronization signal) and compare the time length with the reference length. For example, the display driver circuitry 220 may execute a single scan or multiple scans within the current time interval in accordance with a comparison result. For example, the start timing of the scan within the previous time interval may be a start timing of a single scan within the previous time interval or a start timing of a last scanning from among multiple scans within the previous time interval.

For example, the processor 210 may provide the first image 601 to the display driver circuitry 220 within the first time interval 610 in response to the synchronization signal at a timing 611. For example, the display driver circuitry 220 may execute writing 612 of the first image 601 obtained from the processor 210 in the GRAM 230 within the first time interval 610. For example, the display driver circuitry 220 may execute a scan 613 of the first image 601 written in the GRAM 230 within the first time interval 610. For example, the display driver circuitry 220 may display the first image 601 on the display panel 240, based on the scan 613, which is the single scan, as in a state 614.

For example, in response to the synchronization signal at a timing 621, the processor 210 may provide, to the display driver circuitry 220, a second image 602 subsequent to the first image 601 within a second time interval 620 subsequent to the first time interval 610. For example, the display driver circuitry 220 may execute writing 622 of the second image 602 obtained from the processor 210 in the GRAM 230 within the second time interval 620. For example, the display driver circuitry 220 may execute a scan 623 of the second image 602 written in the GRAM 230.

For example, since a time length 670 between a start timing 615 of the scan 613 of the first image 601 executed within the first time interval 610 and a start timing 625 of the scan 623 of the second image 602 executed within the second time interval 620 is equal to the reference length, the display driver circuitry 220 may further execute a scan 626 of the second image 602 within the second time interval 620. For example, the display driver circuitry 220 may further execute the scan 626 based on identifying the time length 670 being equal to the reference length. For example, the display driver circuitry 220 may further execute the scan 626, based on (or in response to) executing the single scan within the first time interval 610 prior to the second time interval 620. For example, the display driver circuitry 220 may execute multiple scans 627, of the second image 602, including the scan 623 of the second image 602 and the scan 626 of the second image 602, within the second time interval 620. For example, the display driver circuitry 220 may display the second image 602 on the display panel 240, based on the multiple scans 627, as in a state 624. For example, the second time interval 620 may be a time interval for reducing a probability of afterimage occurring.

For example, in response to the synchronization signal at a timing 631, the processor 210 may provide, to the display driver circuitry 220, a third image 603 subsequent to the second image 602 within a third time interval 630 subsequent to the second time interval 620. For example, the display driver circuitry 220 may execute writing 632 of the third image 603 obtained from the processor 210 in the GRAM 230 within the third time interval 630. For example, the display driver circuitry 220 may execute a scan 633 of the third image 603 written in the GRAM 230.

For example, since a time length 680 between a start timing 628 of the scan 626 (e.g., a last scanning from among the multiple scans 627 within the second time interval 620) of the second image 602 that was executed within the second time interval 620 and a start timing 635 of the scan 633 of the third image 603 within the third time interval 630 is shorter than the reference length, the display driver circuitry 220 may bypass or refrain from executing an additional scan of the third image 603 within the third time interval 630 and may execute a single scan (e.g., the scan 633) within the third time interval 630. For example, the display driver circuitry 220 may execute the single scan, based on identifying the time length 680 being shorter than the reference length. For example, the display driver circuitry 220 may execute the single scan, based on (or in response to) executing the multiple scans 627 within the second time interval 620 prior to the third time interval 630. For example, the display driver circuitry 220 may display the third image 603 on the display panel 240, based on the single scan, as in a state 634. For example, unlike the second time interval 620 executing the multiple scans 627, since the third time interval 630 is a time interval executing the single scan, the third time interval 630 may be a time interval for reducing power consumed by providing a content.

For example, the processor 210 may provide, to the display driver circuitry 220, a fourth image 604 subsequent to the third image 603 within a fourth time interval 640 subsequent to the third time interval 630, in response to the synchronization signal at a timing 641. For example, the display driver circuitry 220 may execute writing 642 of the fourth image 604 obtained from the processor 210 in the GRAM 230 within the fourth time interval 640. For example, the display driver circuitry 220 may execute a scan 643 of the fourth image 604 written in the GRAM 230.

For example, since a time length 690 between a start timing 635 of the scan 633 of the third image 603 that was executed within the third time interval 630 and a start timing 645 of the scan 643 of the fourth image 604 within the fourth time interval 640 is equal to the reference length, the display driver circuitry 220 may further execute a scan 646 of the fourth image 604 within the fourth time interval 640. For example, the display driver circuitry 220 may further execute the scan 646 based on identifying a time length 690 being equal to the reference length. For example, the display driver circuitry 220 may further execute the scan 646 based on (or in response to) executing the single scan within the third time interval 630 prior to the fourth time interval 640. For example, the display driver circuitry 220 may execute multiple scans 647 of the fourth image 604 including the scan 643 of the fourth image 604 and the scan 646 of the fourth image 604, within the fourth time interval 640. For example, the display driver circuitry 220 may display the fourth image 604 on the display panel 240, based on the multiple scans 647 as in a state 644. For example, the fourth time interval 640 may be a time interval for reducing a probability of afterimage occurring.

As described above, the processor 210 may alternately execute multiple scans and a single scan, based on the reference length corresponding to the FPS.

Although not illustrated in FIG. 6, each of the first time interval 610 to the fourth time interval 640 may further include a self-scan. For example, the display driver circuitry 220 may execute a self-scan within each of the first time interval 610 to the fourth time interval 640. For example, a self-scan within the first time interval 610 may be executed after the scan 613 is executed. For example, a self-scan within the second time interval 620 may be executed after the scan 626 is executed. However, the disclosure is not limited in this respect. For example, unlike the illustration in FIG. 6, the self-scan within the second time interval 620 may be executed between the scan 623 and the scan 626. In this case, the scan 626 may be executed within the second time interval 620 after the self-scan is executed. For example, unlike the illustration in FIG. 6, the scan 626 may be delayed. For example, the self-scan within the third time interval 630 may be executed after the scan 633 is executed. For example, the self-scan within the fourth time interval 640 may be executed after the scan 646 is executed. However, the disclosure is not limited in this respect. For example, unlike the illustration in FIG. 6, the self-scan within the fourth time interval 640 may be executed between the scan 643 and the scan 646. In this case, the scan 646 may be executed within the fourth time interval 640 after the self-scan is executed. For example, unlike the illustration in FIG. 6, the scan 646 may be delayed.

Referring back to FIG. 2, the electronic device 200 may provide a user interface for enabling or disabling providing the multiple scans. For example, the user interface may be displayed on the display panel 240. For example, the user interface may be provided from a software application for a global setting. However, the disclosure is not limited in this respect. For example, the user interface may also be provided from a software application for providing a content. The user interface will be discussed with reference to FIGS. 7 and 8.

Figure 7:
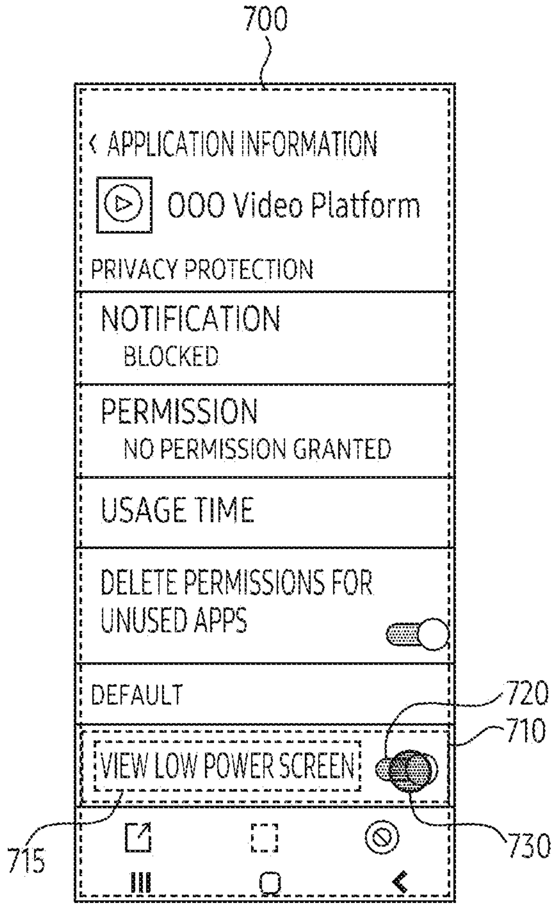
FIG. 7 illustrates an example user interface for disabling providing multiple scans according to various embodiments.

FIG. 7 illustrates an example user interface for disabling providing multiple scans according to various embodiments.

Referring to FIG. 7, the display driver circuitry 220 may display a user interface 700. For example, the user interface 700 may be provided through a software application providing a global setting. However, the disclosure is not limited in this respect. For example, the user interface 700 may include an item 710. For example, the item 710 may include text 715 to indicate disabling providing multiple scans. For example, the item 710 may include an executable object 720 for disabling or enabling providing multiple scans. For example, the executable object 720 may be used to disable or enable providing multiple scans, in response to a user input (e.g., user input 730). For example, the processor 210 may, in response to the user input 730 for the executable object 720, identify whether to disable providing multiple scans or to enable providing multiple scans, and transmit, to the display driver circuitry 220, a signal indicating to disable providing multiple scans or to enable providing multiple scans based on a result of the identification.

Figure 8:
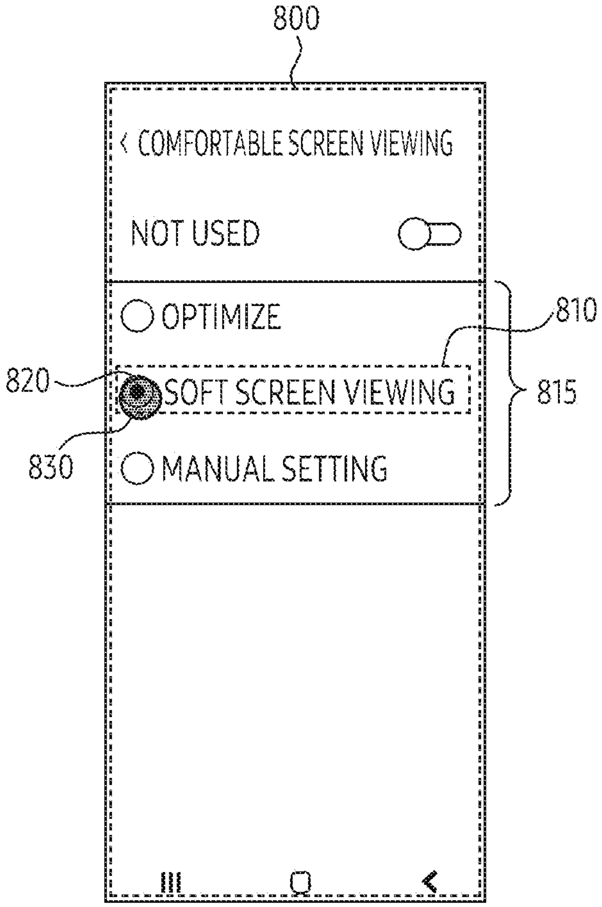
FIG. 8 illustrates an example user interface for enabling providing multiple scans according to various embodiments.

FIG. 8 illustrates an example user interface for enabling providing multiple scans according to various embodiments.

Referring to FIG. 8, the display driver circuitry 220 may display a user interface 800. For example, the user interface 800 may be provided through a software application providing a global setting. However, the disclosure is not limited in this respect. For example, the user interface 800 may include a plurality of items 815 including an item 810. For example, the item 810 may be used to execute multiple scans at each time interval. For example, the item 810 may include an object 820 for identifying selecting of the item 810 from among the plurality of items 815. For example, the processor 210 may, in response to a user input 830 for the object 820 (e.g., user input 830 indicating selecting of the item 810 from among the plurality of items 815), identify enabling providing of the multiple scans at each time interval, and transmit, to the display driver circuitry 220, a signal indicating enabling providing of multiple scans at each time interval based on a result of the identification.

Figure 9:
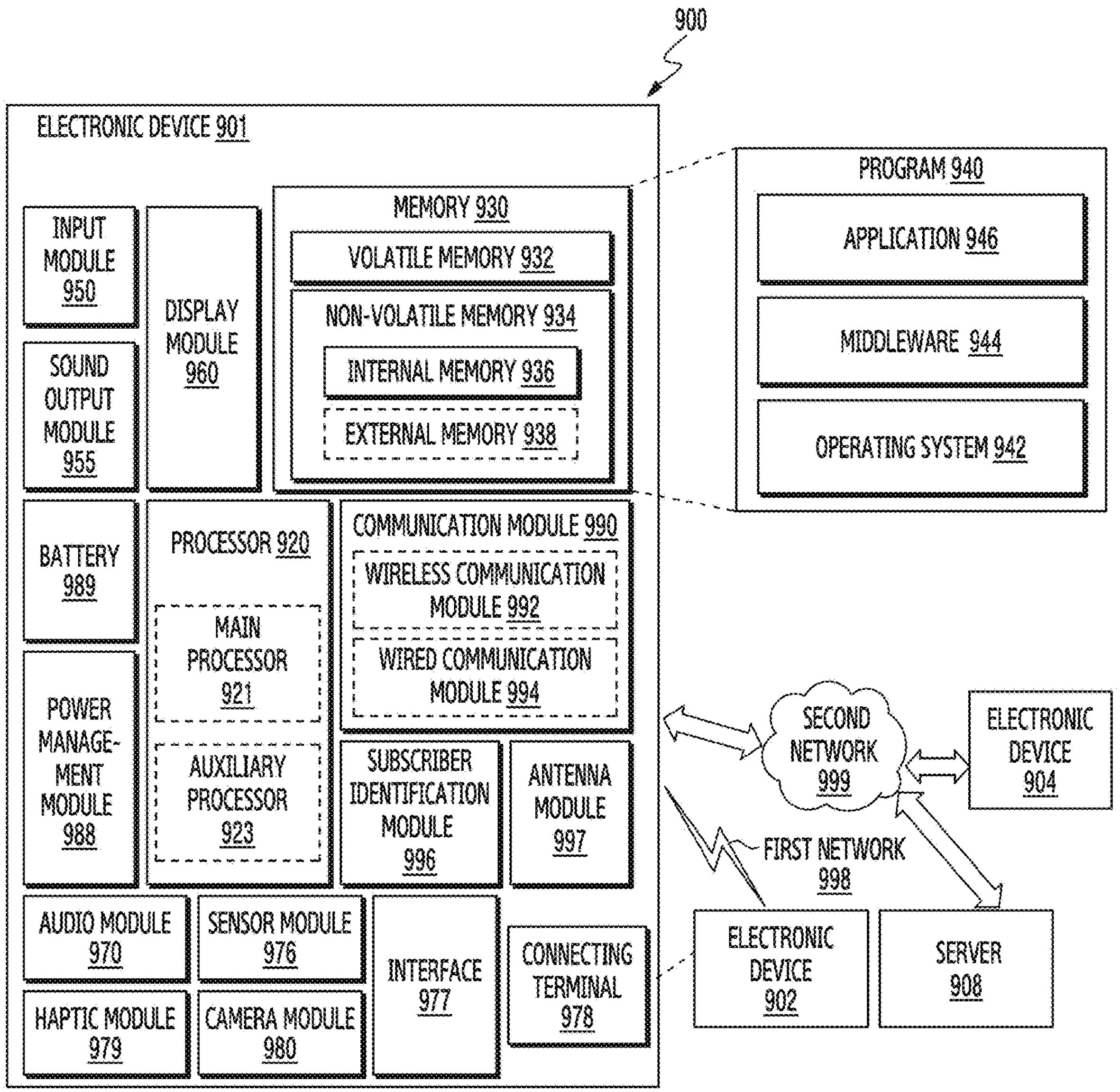
FIG. 9 is a block diagram of an example electronic device in a network environment according to various embodiments.

FIG. 9 is a block diagram illustrating an example electronic device 901 in a network environment 900 according to various embodiments. Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In various embodiments, at least one of the components (e.g., the connecting terminal 978) may be omitted from the electronic device 901, or one or more other components may be added in the electronic device 901. In various embodiments, some of the components (e.g., the sensor module 976, the camera module 980, or the antenna module 997) may be implemented as a single component (e.g., the display module 960).

The processor 920 (including, e.g., processing circuitry) may execute, for example, software (e.g., a program 940) to control at least one other component (e.g., a hardware or software component) of the electronic device 901 coupled with the processor 920, and may perform various data processing or computation. According to an embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, the various processors may operate individually or collectively to perform operations or functions. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of, the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 (including, e.g., input circuitry) may receive a command or data to be used by another component (e.g., the processor 920) of the electronic device

901, from the outside (e.g., a user) of the electronic device 901. The input module 950 may include, for example, a microphone, a mouse, a keyboard, a key (e.g., a button), or a digital pen (e.g., a stylus pen).

The sound output module 955 (including, e.g., sound output circuitry) may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 (including, e.g., audio circuitry) may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 (including, e.g., interface circuitry) may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, an HDMI connector, a USB connector, a SD card connector, or an audio connector (e.g., a headphone connector).

The haptic module 979 (including, e.g., haptic circuitry) may convert an electrical signal into a mechanical stimulus (e.g., a vibration or a movement) or electrical stimulus which may be recognized by a user via tactile sensation or kinesthetic sensation. According to an embodiment, the haptic module 979 may include, for example, a motor, a piezoelectric element, or an electric stimulator.

The camera module 980 (including, e.g., a camera) may capture a still image or moving images. According to an embodiment, the camera module 980 may include one or more lenses, image sensors, image signal processors, or flashes.

The power management module 988 may manage power supplied to the electronic device 901. According to an embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 (including, e.g., communication circuitry) may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors (each including, e.g., communication processing circuitry) that are operable independently from the processor 920 (e.g., the application processor (AP)) and supports a direct (e.g., wired) communication or a wireless communication. According to an embodiment, the communication module 990 may include a wireless communication module 992 (including, e.g., wireless communication circuitry) (e.g., a cellular communication module, a short-range wireless communication module, or a global navigation satellite system (GNSS) communication module) or a wired communication module 994 (including, e.g., wired communication circuitry) (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 964 dB or less) for implementing mMTC, or U-plane latency (e.g., 0.5 ms or less for each of downlink (DL) and uplink (UL), or a round trip of 9 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element including a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In an embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

Figure 10:
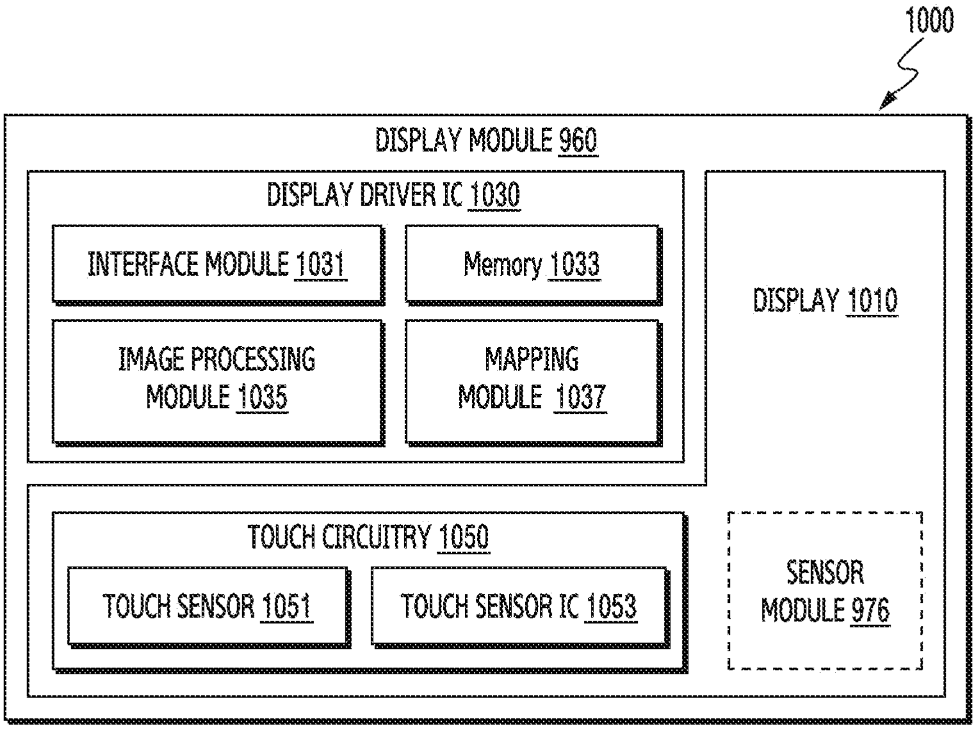
FIG. 10 is a block diagram of an example display module according to various embodiments.

FIG. 10 is a block diagram 1000 illustrating an example display module 960 according to various embodiments. Referring to FIG. 10, the display module 960 may include a display 1010 and a display driver integrated circuit (DDI) 1030 to control the display 1010. The DDI 1030 may include an interface module 1031 (including, e.g., interface circuitry), memory 1033 (e.g., buffer memory), an image processing module 1035 (including, e.g., image processing circuitry), or a mapping module 1037 (including, e.g., mapping circuitry). The DDI 1030 may receive image information that contains image data or an image control signal corresponding to a command to control the image data from another component of the electronic device 901 via the interface module 1031. For example, according to an embodiment, the image information may be received from the processor 920 (e.g., the main processor 921 (e.g., an application processor)) or the auxiliary processor 923 (e.g., a graphics processing unit) operated independently from the function of the main processor 921. The DDI 1030 may communicate, for example, with touch circuitry 1050 or the sensor module 976 via the interface module 1031. The DDI 1030 may also store at least part of the received image information in the memory 1033, for example, on a frame by frame basis. The image processing module 1035 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1010. The mapping module 1037 may generate a voltage value or a current value corresponding to the image data pre-processed or post-processed by the image processing module 1035. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1010 may be driven, for example, based at least in part on the voltage value or the current value such that visual information (e.g., a text, an image, or an icon) corresponding to the image data may be displayed via the display 1010.

According to an embodiment, the display module 960 may further include the touch circuitry 1050. The touch circuitry 1050 may include a touch sensor 1051 and a touch sensor IC 1053 to control the touch sensor 1051. The touch sensor IC 1053 may control the touch sensor 1051 to sense a touch input or a hovering input with respect to a certain position on the display 1010. To achieve this, for example, the touch sensor 1051 may detect (e.g., measure) a change in a signal (e.g., a voltage, a quantity of light, a resistance, or a quantity of one or more electric charges) corresponding to the certain position on the display 1010. The touch circuitry 1050 may provide input information (e.g., a position, an area, a pressure, or a time) indicative of the touch input or the hovering input detected via the touch sensor 1051 to the processor 920. According to an embodiment, at least part (e.g., the touch sensor IC 1053) of the touch circuitry 1050 may be formed as part of the display 1010 or the DDI 1030, or as part of another component (e.g., the auxiliary processor 923) disposed outside the display module 960.

According to an embodiment, the display module 960 may further include at least one sensor (e.g., a fingerprint sensor, an iris sensor, a pressure sensor, or an illuminance sensor) of the sensor module 976 or a control circuit for the at least one sensor. In such a case, the at least one sensor or the control circuit for the at least one sensor may be embedded in one portion of a component (e.g., the display 1010, the DDI 1030, or the touch circuitry 1050)) of the display module 960. For example, when the sensor module 976 embedded in the display module 960 includes a biometric sensor (e.g., a fingerprint sensor), the biometric sensor may obtain biometric information (e.g., a fingerprint image) corresponding to a touch input received via a portion of the display 1010. For example, when the sensor module 976 embedded in the display module 960 includes a pressure sensor, the pressure sensor may obtain pressure information corresponding to a touch input received via a partial or whole area of the display 1010. According to an embodiment, the touch sensor 1051 or the sensor module 976 may be disposed between pixels in a pixel layer of the display 1010, or over or under the pixel layer.

As described above, according to an embodiment, an electronic device 200 may include a processor 210, display driver circuitry 220 including a graphic random access memory (GRAM) 230, and a display panel 240. According to an embodiment, the display driver circuitry 220 may be configured to change an image stored in the GRAM 230, from a first image provided from the processor 210 in a first time interval in response to a synchronization signal from the display driver circuitry 220, to a second image provided from the processor 210 in a second time interval subsequent to the first time interval in response to the synchronization signal. According to an embodiment, the display driver circuitry 220 may be configured to, on a condition that a time length between a start timing of a last scanning, of the first image stored in the GRAM 230, which was executed in the first time interval and a start timing of an initial scanning of the second image stored in the GRAM 230 is longer than or equal to a reference length, based on executing multiple scans of the second image stored in the GRAM 230 in the second time interval, display, on the display panel 240, the second image. According to an embodiment, the display driver circuitry 220 may be configured to, on a condition that the time length is shorter than the reference length, based on executing a single scan of the second image stored in the GRAM 230 in the second time interval, display, on the display panel 240, the second image.

According to an embodiment, the display panel 240 may include sub-pixels each including a light emitting diode (LED) and a transistor for providing a current to the LED. According to an embodiment, the multiple scans may include a first scan and a second scan subsequent to the first scan. According to an embodiment, on a condition that the time length is longer than or equal to the reference length, the second image may be displayed based on applying a data voltage to a gate electrode of the transistor in accordance with the first scan and applying again the data voltage to the gate electrode of the transistor in accordance with the second scan, in the second time interval.

According to an embodiment, the gate electrode may be initialized before the data voltage is applied in accordance with the first scan. According to an embodiment, the gate electrode may be initialized again before the data voltage is applied again in accordance with the second scan.

According to an embodiment, the display driver circuitry 220 may be configured to, on a condition that the time length is shorter than the reference length, further based on providing, via the transistor, to the LED, the current before the gate electrode to which the data voltage is applied in accordance with the single scan is initialized, display the second image.

According to an embodiment, the display driver circuitry 220 may be configured to, on a condition that a frames per second (FPS) of a content provided through displaying of the first image and the second image is less than or equal to a reference value and the time length is longer than or equal to the reference length, based on executing the multiple scans, display the second image. According to an embodiment, the display driver circuitry 220 may be configured to, on a condition that the FPS is less than or equal to the reference value and the time length is shorter than the reference length, based on executing the single scan, display the second image.

According to an embodiment, the display driver circuitry 220 may be configured to, on a condition that the FPS is greater than the reference value, independently of a relation between the time length and the reference length, based on executing the single scan, display the second image.

According to an embodiment, a content provided through displaying of the first image and the second image may include a high contrast area.

According to an embodiment, a content provided through displaying of the first image and the second image may include a visual object having a shape changed in accordance with changing of an image that includes changing from the first image to the second image. According to an embodiment, a position of the visual object may be maintained independently of the changing of image.

According to an embodiment, the reference length may be identified based on an illuminance around the electronic device 200.

According to an embodiment, the reference length may correspond to a frames per second (FPS) of a content provided through displaying of the first image and the second image.

According to an embodiment, the display driver circuitry 220 may be configured to change the image stored in the GRAM 230 from the second image to a third image provided from the processor 210 in a third time interval subsequent to the second time interval. According to an embodiment, the display driver circuitry 220 may be configured to, on a condition that the time length is longer than or equal to the reference length corresponding to a frames per second (FPS) of a content provided through displaying of the first image, the second image, and the third image, based on executing a single scan of the third image stored in the GRAM 230 in the third time interval, display, on the display panel 240, the third image. According to an embodiment, the display driver circuitry 220 may be configured to, on a condition that the time length is shorter than the reference length, based on executing multiple scans of the third image stored in the GRAM 230 in the third time interval, display, on the display panel 240, the third image.

According to an embodiment, the time length may be identified through a cycle of a vertical synchronization signal.

According to an embodiment, information regarding the reference length may be provided from the processor 210.

According to an embodiment, the display driver circuitry 220 may be configured to compare the reference length with the time length. According to an embodiment, the display driver circuitry 220 may be configured to, in response to the time length longer than or equal to the reference length, based on executing the multiple scans in the second time interval, display the second image. According to an embodiment, the display driver circuitry 220 may be configured to, in response to the time length shorter than the reference length, based on executing the single scan in the second time interval, display the second image.

As described above, according to an embodiment, an electronic device 200 may include a processor 210, display driver circuitry 220 including a graphic random access memory (GRAM) 230, and a display panel 240. According to an embodiment, the display driver circuitry 220 may be configured to change an image stored in the GRAM 230, from a first image provided from the processor 210 in a first time interval in response to a synchronization signal from the display driver circuitry 220, to a second image provided from the processor 210 in a second time interval subsequent to the first time interval in response to the synchronization signal. According to an embodiment, the display driver circuitry 220 may be configured to, on a condition that a single scan of the first image stored in the GRAM 230 is executed within the first time interval for displaying of the first image, display, on the display panel 240, the second image, based on executing multiple scans of the second image stored in the GRAM 230 within the second time interval. According to an embodiment, the display driver circuitry 220 may be configured to, on a condition that multiple scans of the first image stored in the GRAM 230 are executed within the first time interval for displaying of the first image, display, on the display panel 240, the second image, based on executing a single scan of the second image stored in the GRAM 230 within the second time interval.

According to an embodiment, the display driver circuitry 220 may be configured to change the image stored in the GRAM 230 from the second image to a third image provided from the processor 210 within a third time interval subsequent to the second time interval. According to an embodiment, the display driver circuitry 220 may be configured to, on a condition that the multiple scans of the second image stored in the GRAM 230 are executed within the second time interval, display, on the display panel 240, the third image, based on executing a single scan of the third image stored in the GRAM 230 within the third time interval. According to an embodiment, the display driver circuitry 220 may be configured to, on a condition that the single scan of the second image stored in the GRAM 230 is executed within the second time interval, display, on the display panel 240, the third image, based on executing multiple scans of the third image stored in the GRAM 230 within the third time interval.

According to an embodiment, a length of the first time interval may be equal to a length of the second time interval. According to an embodiment, the display driver circuitry 220 may be configured to, based at least in part on a reference length being equal to the length of the first time interval, indicated by information obtained from the processor 210, execute the multiple scans of the second image or execute the single scan of the second image.

According to an embodiment, the display driver circuitry 220 may be configured to, based on identifying that a time length between a start timing of a last scanning from among the multiple scans of the first image and an end timing of the first time interval is shorter than the reference length, execute the single scan of the second image. According to an embodiment, the display driver circuitry 220 may be configured to, based on identifying that a time length between a start timing of the single scan of the first image and the end timing of the first time interval is equal to the reference length, execute the multiple scans of the second image.

According to an embodiment, each of the multiple scans of the first image and the multiple scans of the second image may be executed further based on an illuminance around the electronic device 200 being lower than a reference illuminance.

According to an embodiment, the display panel 240 may include LEDs. According to an embodiment, the display driver circuitry 220 may be configured to, based on executing the single scan of the first image and multiple light emissions of at least some of the LEDs within the first time interval, display, on the display panel 240, the first image. According to an embodiment, the display driver circuitry 220 may be configured to, based on executing the single scan of the second image and multiple light emissions of at least some of the LEDs within the second time interval, display, on the display panel 240, the second image.

The technical problems to be achieved in this document are not limited to those described above, and other technical problems not mentioned herein will be clearly understood by those having ordinary knowledge in the art to which the present disclosure belongs, from the following description.

The effects that can be obtained from the present disclosure are not limited to those described above, and any other effects not mentioned herein will be clearly understood by those having ordinary knowledge in the art to which the present disclosure belongs, from the following description.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as “A or B,” “at least one of A and B,” “at least one of A or B,” “A, B, or C,” “at least one of A, B, and C,” “at least one of A, B, or C,” and “at least one of A, B, and/or C” may include any one of or all possible combinations of the items enumerated together in a corresponding one of the phrases. As used herein, such terms as “1st” and “2nd,” or “first” and “second” may be used to simply distinguish a corresponding component from another, and do not limit the components in other aspect (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" simply refers to the storage medium being a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The disclosure has been described with reference to the embodiments. It would be appreciated by those skilled in the art that changes may be made to these embodiments without departing from the principles and spirit of the disclosure. Therefore, the disclosed embodiments are provided for the purpose of describing the disclosure and the disclosure should not be construed as being limited to only the embodiments set forth herein. The scope of the disclosure is defined by the claims as opposed to by the above-mentioned descriptions, and it should be understood that disclosure includes all differences made within the equivalent scope. It will also be understood that any of the embodiment(s) described herein may be used in conjunction with any other embodiment(s) described herein.

What is claimed is:

1. An electronic device comprising:

at least one processor comprising processing circuitry;

display driver circuitry including a graphic random access memory (GRAM); and a display panel, wherein the display driver circuitry is configured to:

change an image stored in the GRAM from a first image to a second image, the first image being provided from the at least one processor in a first time interval in response to a synchronization signal from the display driver circuitry and the second image being provided from the at least one processor in a second time interval subsequent to the first time interval in response to the synchronization signal;

on a condition that a time length between a start timing of a last scanning of the first image stored in the GRAM executed in the first time interval and a start timing of an initial scanning of the second image stored in the GRAM is longer than or equal to a reference time length, display, on the display panel, the second image, based on executing multiple scans of the second image stored in the GRAM in the second time interval, wherein the multiple scans of the second image are performed sequentially in the second time interval; and on a condition that the time length is shorter than the reference time length, display, on the display panel, the second image, based on executing a single scan of the second image stored in the GRAM in the second time interval.

2. The electronic device of claim 1, wherein the display panel includes sub-pixels each including a light emitting diode (LED) and a transistor for providing a current to the LED, wherein the multiple scans include a first scan and a second scan subsequent to the first scan, and wherein, on the condition that the time length is longer than or equal to the reference time length, the second image is displayed based on applying a data voltage to a gate electrode of the transistor in accordance with the first scan and applying again the data voltage to the gate electrode of the transistor in accordance with the second scan, in the second time interval.

3. The electronic device of claim 2, wherein the display driver circuitry is configured to:

initialize the gate electrode before the data voltage is applied in accordance with the first scan, and initialize the gate electrode again before the data voltage is applied again in accordance with the second scan.

4. The electronic device of claim 2, wherein the display driver circuitry is configured to:

on the condition that the time length is shorter than the reference time length, further based on providing, via the transistor, to the LED, the current before the gate electrode to which the data voltage is applied in accordance with the single scan is initialized, display the second image.

5. The electronic device of claim 1, wherein the display driver circuitry is configured to:

on a condition that a frames per second (FPS) of a content provided through displaying of the first image and the second image is less than or equal to a reference value and the time length is longer than or equal to the reference time length, display the second image, based on executing the multiple scans; and on a condition that the FPS is less than or equal to the reference value and the time length is shorter than the reference time length, display the second image, based on executing the single scan.

6. The electronic device of claim 5, wherein the display driver circuitry is further configured to:

on a condition that the FPS is greater than the reference value, independently of a relation between the time length and the reference time length, display the second image, based on executing the single scan.

7. The electronic device of claim 1, wherein a content provided through displaying of the first image and the second image includes a high contrast area only having black color and white color.

8. The electronic device of claim 1, wherein a content provided through displaying of the first image and the second image includes a visual object having a shape changed in accordance with changing of image that comprises changing from the first image to the second image, and wherein a position of the visual object is maintained independently of the changing of image.

9. The electronic device of claim 1, wherein the reference time length is identified based on an illuminance around the electronic device.

10. The electronic device of claim 1, wherein the reference time length corresponds to a frames per second (FPS) of a content provided through displaying of the first image and the second image.

11. The electronic device of claim 1, wherein the display driver circuitry is further configured to:

change the image stored in the GRAM from the second image to a third image provided from the at least one processor in a third time interval subsequent to the second time interval;

on a condition that the time length is longer than or equal to the reference time length corresponding to a frames per second (FPS) of a content provided through displaying of the first image, the second image, and the third image, display, on the display panel, the third image, based on executing a single scan of the third image stored in the GRAM in the third time interval; and on a condition that the time length is shorter than the reference time length, display, on the display panel, the third image, based on executing multiple scans of the third image stored in the GRAM in the third time interval.

12. The electronic device of claim 1, wherein the time length is identified through a cycle of a vertical synchronization signal.

13. The electronic device of claim 1, wherein information regarding the reference time length is provided from the at least one processor.

14. The electronic device of claim 13, wherein the display driver circuitry is configured to:

compare the reference time length with the time length;

in response to the time length being longer than or equal to the reference time length, display the second image, based on executing the multiple scans in the second time interval; and in response to the time length shorter than the reference time length, display the second image, based on executing the single scan in the second time interval.

15. An electronic device comprising:

at least one processor comprising processing circuitry;

display driver circuitry including a graphic random access memory (GRAM); and a display panel, wherein the display driver circuitry is configured to:

change an image stored in the GRAM, from a first image to a second image, the first image being provided from the at least one processor in a first time interval in response to a synchronization signal from the display driver circuitry and the second image being provided from the at least one processor in a second time interval subsequent to the first time interval in response to the synchronization signal;

on a condition that a single scan of the first image stored in the GRAM is executed within the first time interval for displaying of the first image, display, on the display panel, the second image, based on executing multiple scans of the second image stored in the GRAM within the second time interval, wherein the multiple scans of the second image are performed sequentially in the second time interval; and on a condition that multiple scans of the first image stored in the GRAM are executed within the first time interval for displaying of the first image, display, on the display panel, the second image, based on executing a single scan of the second image stored in the GRAM within the second time interval.

16. The electronic device of claim 15, wherein the display driver circuitry is configured to:

change the image stored in the GRAM from the second image to a third image provided from the at least one processor within a third time interval subsequent to the second time interval;

on a condition that the multiple scans of the second image stored in the GRAM are executed within the second time interval, display, on the display panel, the third image, based on executing a single scan of the third image stored in the GRAM within the third time interval; and on a condition that the single scan of the second image stored in the GRAM is executed within the second time interval, display, on the display panel, the third image, based on executing multiple scans of the third image stored in the GRAM within the third time interval.

17. The electronic device of claim 15, wherein, based on a length of the first time interval is equal to a length of the second time interval the display driver circuitry is configured to, based at least in part on a reference time length being equal to the length of the first time interval, indicated by information obtained from the at least one processor, execute the multiple scans of the second image or execute the single scan of the second image.

18. The electronic device of claim 17, wherein the display driver circuitry is configured to:

based on identifying that a time length between a start timing of a last scanning from among the multiple scans of the first image and an end timing of the first time interval is shorter than the reference time length, execute the single scan of the second image; and based on identifying that a time length between a start timing of the single scan of the first image and the end timing of the first time interval is equal to the reference time length, execute the multiple scans of the second image.

19. The electronic device of claim 15, wherein each of the multiple scans of the first image and the multiple scans of the second image may be executed further based on an illuminance around the electronic device being lower than a reference illuminance.

20. The electronic device of claim 15, further comprising: light emitting diodes (LEDs), wherein the display driver circuitry is configured to:

based on executing the single scan of the first image and multiple light emissions of at least some of the LEDs within the first time interval, display, on the display panel, the first image; and based on executing the single scan of the second image and multiple light emissions of at least some of the LEDs within the second time interval, display, on the display panel, the second image.

* * * * *